April 14, 1959  E. E. SCHNELL  2,881,883
CLUTCH FOR GRAIN DRILL
Filed Aug. 8, 1956  2 Sheets-Sheet 2
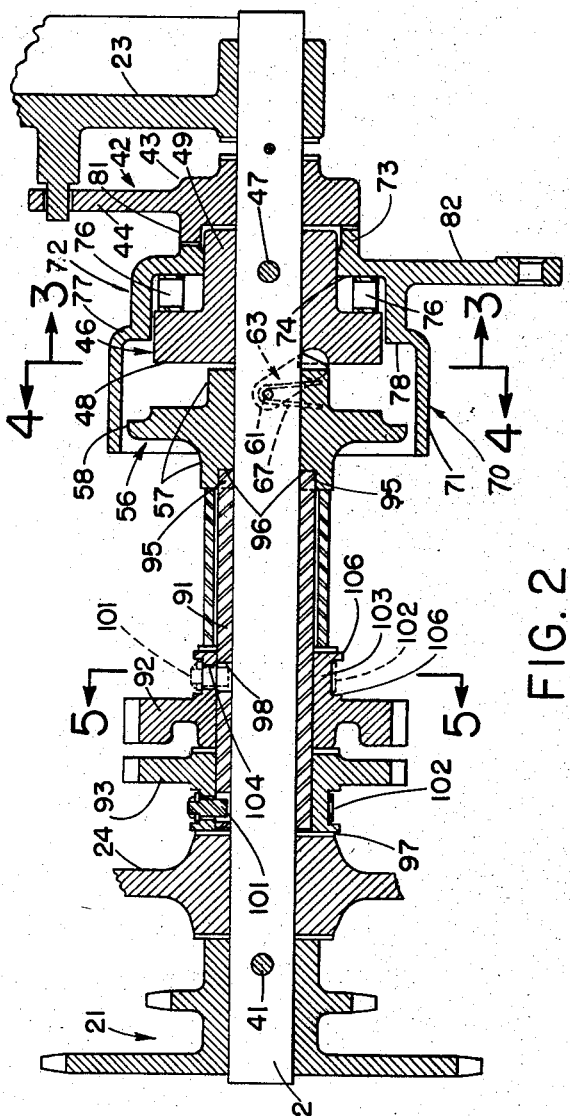
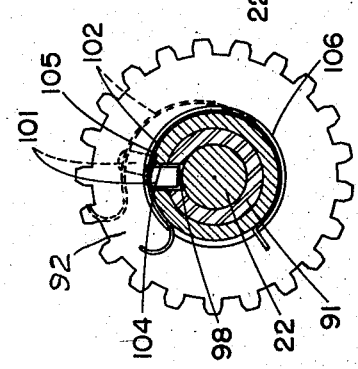
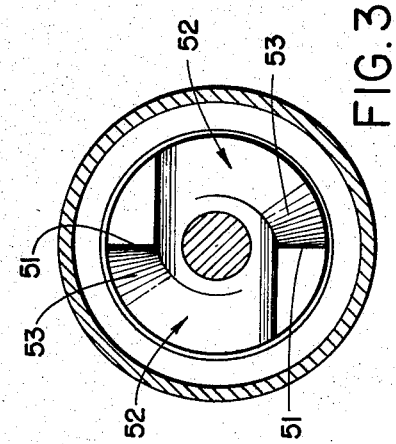
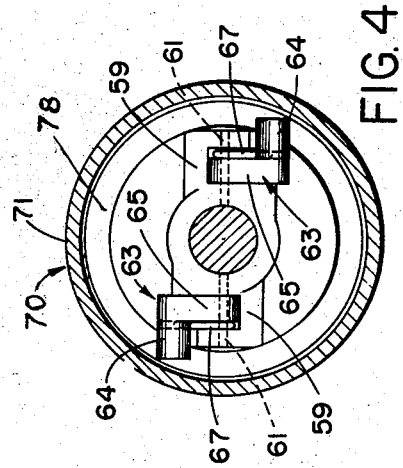
ERNST E. SCHNELL INVENTOR
ATTORNEYS United States Patent Office 2,881,883
Patented Apr. 14, 1959

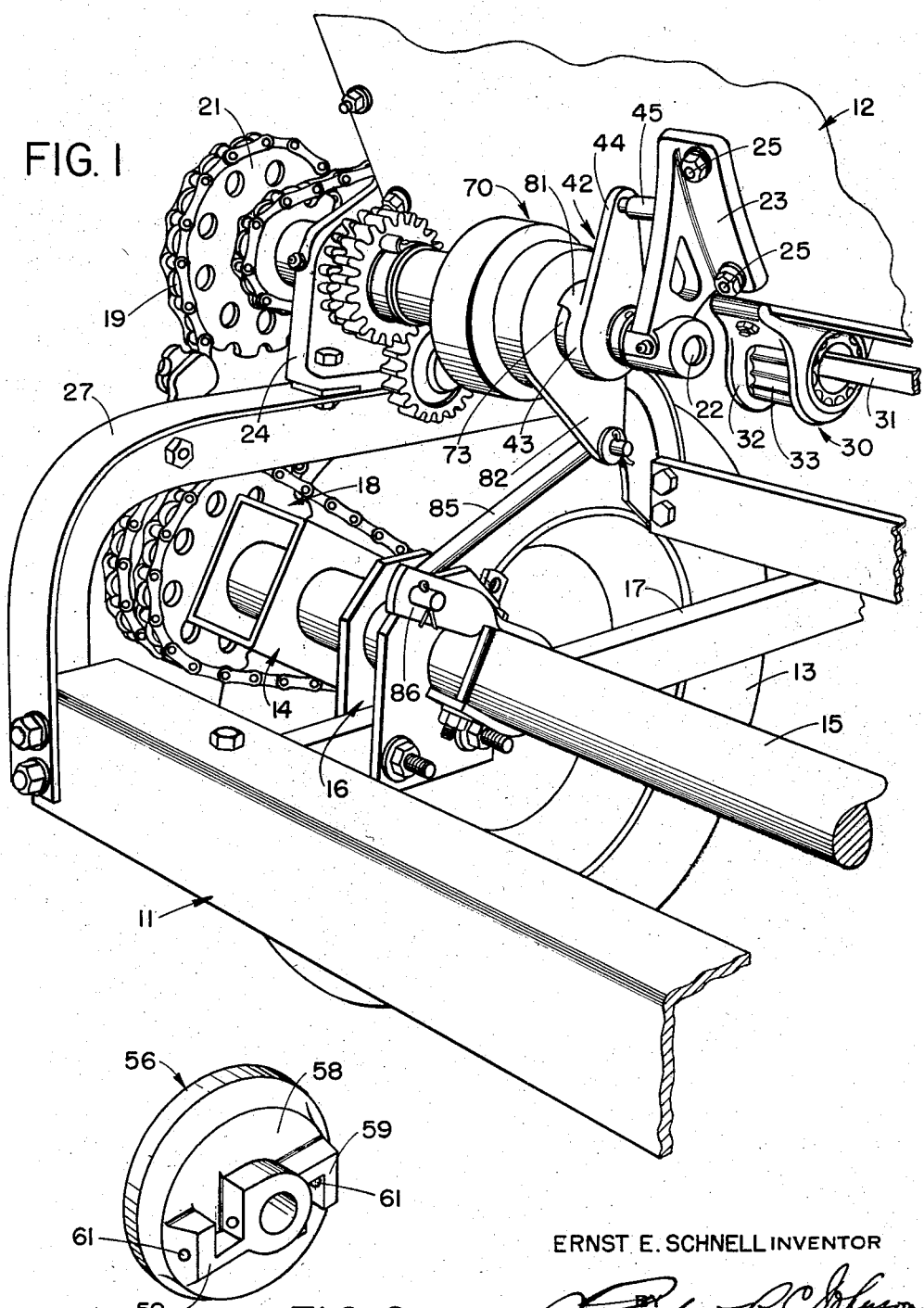

2,881,883
CLUTCH FOR GRAIN DRILL

Ernst E. Schnell, West Bend, Wis., assignor, by mesne assignments, to Deere & Company, a corporation of Delaware Application August 8, 1956, Serial No. 602,809

1 Claim. (Cl. 192—23)

The present invention relates generally to agricultural implements and more particularly to a new and improved drive clutch mechanism for grain drills and other implements.

The object and general nature of the present invention is a provision of a drive clutch mechanism that is so constructed and arranged as to operate more smoothly and subjected to less wear than conventional jaw type clutches. More specifically, it is a feature of this invention to provide a drive clutch mechanism including a driving part and a driven part interconnected through pivoted dogs carried by one part and mounted for movement toward recesses formed in the other part, with an axially shiftable member engageable directly with the driving dogs for moving them out of the recesses and thus disconnecting the drive control for the clutch mechanism.

Another feature of this invention is a new and improved drive mechanism which includes one or more gears mounted for relative rotation on a sleeve or the like, with means including a spring clip and attached pin to provide a convenient and easily operated means for disengaging the gear from the sleeve.

These and other objects and advantages of the present invention will be apparent to those skilled in the art after a consideration of the following detailed description of the preferred structure in which the principles of the present invention have been incorporated and which is illustrated in the accompanying drawings.

In the drawings:

Fig. 1 is a fragmentary perspective view of a portion of a grain drill in which the principles of the present invention have been embodied.

Fig. 2 is an enlarged sectional view taken generally centrally through the clutch and associated parts shown in Fig. 1.

Fig. 3 is a sectional view taken generally along the line 3—3 of Fig. 2.

Fig. 4 is a sectional view taken generally along the line 4—4 of Fig. 2.

Fig. 5 is a sectional view taken generally along the line 5—5 of Fig. 2, certain parts being shown in elevation.

Fig. 6 is a perspective view of the face side of the driven plate member.

Referring first to Fig. 1, the present invention is shown as embodied in the grain drill, shown fragmentarily in Fig. 1, in which the frame of the grain drill is indicated by the reference numeral 11 and the hopper by the reference numeral 12. The grain drill also includes ground engaging supporting means which preferably takes the form of a pair of ground wheels 13 journaled on the lower ends of crank arms 14 that are secured to the ends of a rockshaft 15 journaled for rocking movement, as by bracket means 16, that are secured to crossbars 17 forming a part of the frame 11. Only one of the ground wheels 13 and the associated crank arm 14 are shown in Fig. 1. A sprocket (not shown) is carried by the wheel 13 and is connected to one sprocket section of a double sprocket 18 that is journaled on the outer end portion of the rockshaft 15. The other sprocket section is connected by a drive chain 19 to a sprocket 21 that is fixed, as by a pin or the like, to the outer end of an associated jack shaft 22. The latter is carried in a pair of brackets 23 and 24, the bracket 23 being fixed, as by bolts 25, to the hopper while the other bracket 24 is fixed to an end frame member 27 that forms a part of the grain drill frame 11. The hopper 12 also carries seed dispensing means indicated in its entirety by the reference numeral 30, which mechanism includes a feed shaft 31 extending along the bottom of the hopper 12 and a plurality of feed cups 32 in which fluted feed rolls 33 are respectively disposed. The feed shaft 31 is driven from the jack shaft 22 through drive mechanism that forms the subject matter of the present invention.

Referring now to Fig. 2, it will be seen that the jack shaft 22 is supported for rotation in the inner bracket 23 and in the outer bracket 24 that actually forms a part of the end structure of the hopper 12, the sprocket 21 being fixed to the shaft 22 by means of a pin 41 and is disposed laterally outwardly of the box end or bracket 24. Located just inside the inner bracket 23 is a stationary cam member 42 that comprises a hub section 43 and an arm portion 44, the latter being apertured to receive a stud 45 (Fig. 1) carried by the bracket 23, which holds the cam member 42 against rotation with the shaft 22. A drive plate or drive member 46 is connected, as by a pin 47, with the shaft 22 and includes a radially extending flange portion 48 and a hub section 49 that is extended generally axially toward the stationary cam 42. The axially facing portion of the drive plate 46 is provided with a pair of axially extending, generally diametrically arranged abutments 51 that form a part of what may be considered recesses 52 facing axially outwardly and of which the abutments 51 form, respectively, one wall of each recess. The other wall of the recess is in the nature of an inclined surface 53 leading from the bottom of each recess up to the axially extending portion of which the abutment 51 is a part.

Cooperating with the drive plate member 46 is a driven plate member 56 that is journaled on the shaft adjacent the member 46 and provided with a hub section 57 and an outwardly extending flange section 58. As best shown in Figs. 4 and 6, the face of the flange 58 adjacent the member 46 is provided with a pair of oppositely disposed socket sections 59 that are apertured as at 61a to receive pivot pins 61, and connected in each of the socket sections 59 by the associated pin 61 is a clutch dog 63. Each of the clutch dogs 63 includes a transverse barrel section 64 and an arm section 65 that is apertured to receive the associated pin 61. A hairpin type spring 67 has its coil section disposed about the associated pin 61 and the ends of the spring 67 bear, respectively, against the face of the flange 58 and against the barrel section 64 so as to continually exert a bias against the dog 63 to force the latter generally toward the clutch recesses 52, whereby the dogs enter the recesses when they are permitted to move in that direction.

The clutch dogs are controlled by a slidable clutch throwout cam members 70 that comprises a generally cylindrical part having a cylindrical skirt section 71 and a hub section 72 having axially facing cam lugs 73. There is a space between the flange portion 48 of the drive plate member 46 and the adjacent shouldered portion 74 on the throwout cam member 70, and in this space is disposed circular spring means 76 that continually exerts a bias against the member 46 to move the throwout cam 70 to the right, as viewed in Fig. 2. The skirt section 71 is offset, as at 77, so as to provide a generally axially facing shoulder 78 that cooperates with the outer ends of the barrel sections 64 of the clutch dog 63 so that when the member 70 is moved by the springs 76 to the position shown in Fig. 2, the barrel sections 64 of the clutch dog 63 are permitted to move into the recesses 52 in the face of the member 46. The barrel sections 64 are thus shifted into driving relation with the respective abutments 51, whereby rotation of the shaft 22 is transmitted by the drive plate member 46 through the clutch dogs 63 to the driven plate member 56.

The clutch throwout cam member 70 is adapted to be moved in the other direction, against the bias exerted by the springs 76, by the cam lugs 73 acting in cooperation with cam lugs 81 formed on the stationary cam member 42 mentioned above. The throwout cam member 70 is provided with an operating arm 82 movable through approximately 30°, which movement is sufficient to cause the cam lugs 73 and 81 to cooperate one with the other so as to cause the member 70 to be shifted axially outwardly, which brings the shouldered portion 78 into operative engagement with the clutch dogs 63, forcing them generally axially out of the recesses 52 and out of engagement with the abutment 51, thereby disconnecting the drive between the drive and driven clutch plates 46 and 56. As will be seen in Fig. 1, the clutch member 70 is moved as just described by means of a link 85 connected at one end with the arm 82 and at the other end with an arm 86 that is connected with the rockshaft 15. By virtue of this construction, when the rockshaft 15 is actuated to raise the hopper 12 and associated parts relative to the ground wheels 13, the member 70 is rocked in a direction to disconnect the drive from the jack shaft 22 to the driven clutch plate 56. Conversely, when the hopper 12 and associated parts are lowered to begin the drilling operation, the rocking movement of the shaft 15 is transmitted by the link 85 to the arm 82 and thus rocks the member 70 in a direction to permit the springs 76 to move the member 70 toward the right, as viewed in Fig. 2, which permits the clutch dogs 63 to enter the recesses 52 and thus reconnect the clutch.

According to the principles of the present invention, the drive from the driven clutch plate member 56 to the seeding apparatus, represented by the mechanism 30, is transmitted through a drive sleeve 91 and an optionally connectible drive gear 92. Other drive gears, such as the drive gear 93, for example, are also optionally connectible with the drive sleeve 91. As will best be seen in Fig. 2, the inner end of the drive sleeve 91 is provided with a pair of lugs 95, which are adapted to be received in corresponding recesses 96 formed in the hub section 57 of the driven plate member 56. The sleeve 91 extends along the shaft 22 substantially to the box end or bearing member 24, being separated from the latter by a thrust washer 97. As will best be seen in Fig. 5, adjacent the hub section of the gear 92, the drive sleeve 91 is provided with an aperture 98 that is adapted to receive the selector pin 101 that is carried by a substantially circular selector spring 102. This member encircles the hub 103 of the drive gear 92, and the hub section 103 is also provided with an opening 104 through which the selector pin 101 extends. From Fig. 5 it will be seen that the opening 104 is, adjacent the surface of the hub section 103, extended circumferentially, as indicated at 105, so as to provide a seat to receive and retain the selector pin 101 when the selector spring 102 is flexed outwardly and rotated slightly relative to the hub 103 so as to remove the selector pin 101 from the registering recesses 98 and 104, when it is desired to disconnect the gear 92 from the drive sleeve 91, which may be done independently of whether or not the clutch members 46 and 56 are connected or disconnected. When it is desired to connect the gear 92, for example, to the sleeve 91, the selector spring 102 is shifted so as to permit the selector pin 101 to enter the opening 104 in the gear hub, and also in the sleeve opening 98, when the openings are in registry or alignment, as shown in dotted lines in Fig. 5. For insuring that the selector spring 102 will be retained against axial displacement, the hub section 103 of the gear 92 is provided with axially spaced apart ribs 106. The drive gear 93 is selectively or optionally connectible with the sleeve 91 by substantially the same means as just described, and hence the corresponding parts have been given the same reference numerals. If desired, the drive gear 93 may be connected to drive the seeding mechanism 30 through associated means providing a different ratio, or the drive gear 93 may be connected to drive an associated fertilizer attachment or a grass seed attachment, and the sleeve 91 may be arranged to receive more than the two selectively associated gears 92 and 93 described above.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

Drive mechanism comprising a jack shaft, means connected with one end of said shaft to drive the latter, a drive plate fixed to the other end portion of said shaft and having a pair of generally axially facing recesses, a driven plate journaled on said shaft and having a flange section facing said drive plate, a pair of clutch dogs disposed at opposite sides of the axis of revolution of said driven plate and pivoted to said flange section for movement toward said drive plate about transverse axes, each dog including a generally radially inner portion adapted to enter one of said recesses in the drive plate and a generally radially outer portion extending radially outwardly beyond said drive plate, a clutch throwout cam comprising a generally cylindrical part shiftable axially on said shaft and having a shouldered portion embracing said drive plate in a position to engage the outer portions of both of said clutch dogs substantially simultaneously and, when said throwout cam is moved along said shaft in one direction, swing the radially inner portions of both of said clutch dogs out of engagement in the recesses of said drive plate, thereby disconnecting the drive between said plates, and means connected with said throwout cam for shifting said cylindrical part axially toward and away from the radially outer portions of said clutch dogs.

References Cited in the file of this patent

UNITED STATES PATENTS

| | | |
|---|---|---|
| 837,003 | Sobey et al. | Nov. 27, 1906 |
| 915,298 | Klemm | Mar. 16, 1909 |
| 928,293 | Waterman | July 20, 1909 |
| 996,319 | Daimler | June 27, 1911 |
| 1,645,457 | Schall | Oct. 11, 1927 |
| 1,921,866 | Dina | Aug. 8, 1933 |
| 2,175,627 | Fischel et al. | Oct. 10, 1939 |
| 2,332,743 | Morris | Oct. 26, 1943 |